(12) United States Patent
Lin

(10) Patent No.: US 10,736,460 B2
(45) Date of Patent: Aug. 11, 2020

(54) FANCY COFFEE MAKER

(71) Applicant: Nuo Feng Lin, Guangdong (CN)

(72) Inventor: Nuo Feng Lin, Guangdong (CN)

(73) Assignee: Nuo Feng Lin, Foshan (CN)

( * ) Notice: Subject to any disclaimer, the term of this patent is extended or adjusted under 35 U.S.C. 154(b) by 320 days.

(21) Appl. No.: 15/888,436

(22) Filed: Feb. 5, 2018

(65) Prior Publication Data

US 2019/0069716 A1 Mar. 7, 2019

(30) Foreign Application Priority Data

Sep. 6, 2017 (CN) .................. 2017 2 11352291 U

(51) Int. Cl.
*A47J 31/46* (2006.01)
*A47J 31/30* (2006.01)
*A47J 31/44* (2006.01)

(52) U.S. Cl.
CPC ............. *A47J 31/465* (2013.01); *A47J 31/30* (2013.01); *A47J 31/4485* (2013.01); *A47J 31/461* (2018.08)

(58) Field of Classification Search
CPC ...... A47J 43/128; A47J 31/465; A47J 31/461; A47J 31/30; A47J 31/4485
See application file for complete search history.

(56) References Cited

U.S. PATENT DOCUMENTS

| | | | | |
|---|---|---|---|---|
| 5,207,148 A * | 5/1993 | Anderson | ........... | A47J 31/4485 99/281 |
| 5,265,520 A * | 11/1993 | Giuliano | ............... | A47J 31/401 141/100 |
| 5,473,972 A * | 12/1995 | Rizzuto | ............... | A47J 31/4403 99/290 |
| 5,509,349 A * | 4/1996 | Anderson | ............. | A47J 31/525 99/323.1 |
| 5,778,765 A * | 7/1998 | Klawuhn | ................ | A47J 31/46 99/290 |
| 6,959,642 B1 * | 11/2005 | Landolt | ................. | A47J 31/469 99/455 |
| 7,252,034 B1 * | 8/2007 | Eckenhausen | ...... | A47J 31/4485 99/293 |
| 7,350,457 B2 * | 4/2008 | Wessels | .................. | A47J 31/41 99/323.1 |
| 8,795,752 B2 * | 8/2014 | Kindler | .................... | A23C 9/00 426/474 |

(Continued)

*Primary Examiner* — Jason L Vaughan
(74) *Attorney, Agent, or Firm* — Luoh J. Wu; Continent Patent Office LLP

(57) ABSTRACT

The utility model discloses a fancy coffee maker, comprising a water tank, a first heater, a coffee funnel, a milk tank, a milk frother, a first branch for providing water vapor to the coffee funnel, and a second branch for providing high-temperature steam to the milk tank, and further comprising a three-way valve member, wherein water in the water tank after being heated by the first heater enters the three-way valve member, the three-way valve member is respectively connected to the first and second branches, and the second branch is connected by an electromagnetic valve, a second heater and the milk tank in sequence. The utility model realizes the functional diversification and automation control of a coffee maker, and a liquid heating system has a simple structure, saves energy, and has high efficiency.

4 Claims, 4 Drawing Sheets

(56) References Cited

U.S. PATENT DOCUMENTS

| | | | | |
|---|---|---|---|---|
| 9,038,529 | B2* | 5/2015 | Riessbeck | A47J 31/60 99/275 |
| 9,572,453 | B2* | 2/2017 | Kindler | A47J 31/4485 |
| 2003/0232115 | A1* | 12/2003 | Eckenhausen | A47J 31/4485 426/477 |
| 2004/0247757 | A1* | 12/2004 | Wessels | A47J 31/41 426/490 |
| 2005/0233043 | A1* | 10/2005 | Dirren | A47J 31/4485 426/569 |
| 2007/0107603 | A1* | 5/2007 | Coccia | A47J 31/4485 99/275 |
| 2008/0163896 | A1* | 7/2008 | Ioannone | A47J 31/4485 134/18 |
| 2008/0216665 | A1* | 9/2008 | Hoehne | A47J 31/4485 99/293 |
| 2009/0011110 | A1* | 1/2009 | Gotlenboth | A47J 31/4485 426/594 |
| 2011/0192287 | A1* | 8/2011 | Riessbeck | A47J 31/469 99/285 |
| 2015/0027317 | A1* | 1/2015 | Kelly | A47J 31/46 99/291 |
| 2017/0367528 | A1* | 12/2017 | Savioz | A47J 31/4485 |

* cited by examiner

FANCY COFFEE MAKER

CROSS-REFERENCE TO RELATED APPLICATIONS

The present application claims priority from Chinese patent Application No. 2017211352291, filed on Sep. 6, 2017, the entire contents of which are incorporated herein by reference.

TECHNICAL FIELD

The utility model relates to the field of coffee maker technologies, and more particularly, to a fancy coffee maker.

BACKGROUND ART

Fancy coffee is usually made through adding milk foams in coffee liquid. According to a steam foaming nozzle device of a coffee maker with an application No. 201020575326.4 disclosed on Aug. 10, 2011, rotating to adjust a sleeve can change the indrawn air volume, so as to adjust the fine degree of the milk foams. Moreover, the steam temperature usually needed to make the milk foams is higher than the temperature for extracting coffee liquid, and a liquid heating system with a reasonable structure will make the fancy coffee maker be more energy-saving, and efficient.

SUMMARY OF UTILITY MODEL

The object of the utility model is aimed at providing a fancy coffee maker that has reasonable liquid heating system structure, saves energy, and has high efficiency In order to achieve the object above, the technical solution provided by the utility model is: a fancy coffee maker, which comprises a water tank, a first heater, a coffee funnel, a milk tank, a milk frother, a first branch for providing water vapor to the coffee funnel, and a second branch for providing high-temperature steam to the milk tank, and further comprises a three-way valve member, wherein water in the water tank after being heated by the first heater enters the three-way valve member, the three-way vale member is respectively connected to the first and second branches, and the second branch is connected by an electromagnetic valve, a second heater and the milk tank in sequence.

Wherein the second heater comprises a heat conductor and an electrical heated tube, the heat conductor is internally provided with a long and thin pipeline in a circuitous manner, and the electrical heated tube is arranged on the surface of the heat conductor.

Wherein the heat conductor is spliced by two metal plate members in a sealing manner, the inner surface of one of the metal plate members is provided with a spiral involute groove starting from a central point, the beginning and ending positions of the spiral involute groove are provided with an inlet and an outlet of the heat conductor, the two metal plate members are provided with a plurality of location holes, and the spiral involute groove near partial location holes is avoided by an arc-shaped groove.

Wherein the three-way valve member comprises a three-way valve body and a connecting pipe, the three-way valve body is internally provided with a communication chamber and a valve chamber, the valve port of the valve chamber is arranged in the communication chamber, the valve chamber is internally provided with a mushroom-head rubber plug and a spring, and the spring is used for pushing the mushroom-head rubber plug, so that the valve port is closed.

Wherein the connecting pipe is arranged at the outlet of the valve chamber, the end part of the connecting pipe is provided with a pipe port, the pipe port is connected to a valve chamber wall in a sealing, manner, and the pipe port is internally provided with a spring installation platform.

Wherein the connecting pipe is connected to the first branch,

The utility model has the beneficial effect of realizing the functional diversification and automatic control of the coffee maker, and the liquid heating system has a simple structure, saves energy, and has high efficiency. A spiral involute structure form is used in the second heater, and the heating of an electric heating tube can be fully absorbed based on small volume.

DETAILED DESCRIPTION OF THE PREFERRED EMBODIMENTS

The following embodiments describe the utility model in detail.

Figure 1:
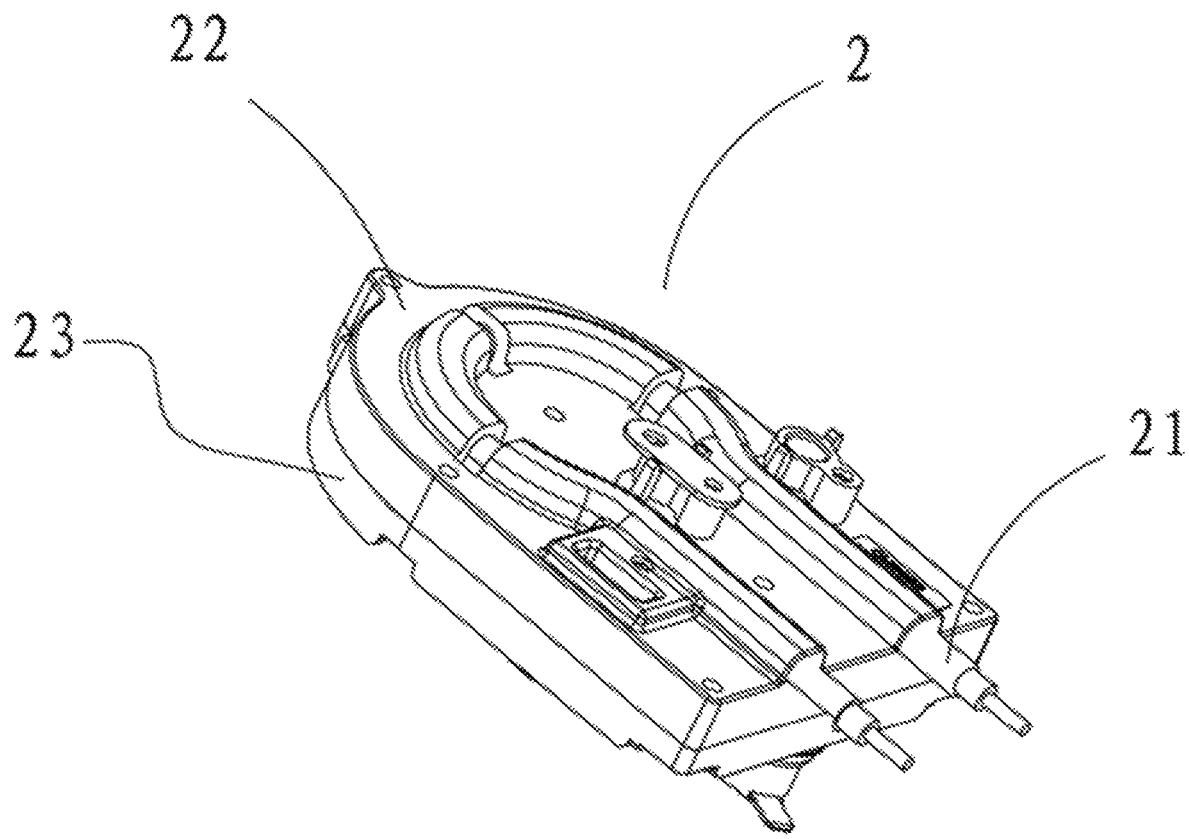
FIG. 1 is a schematic diagram of the structure of a second heater according to the utility model.
Figure 2:
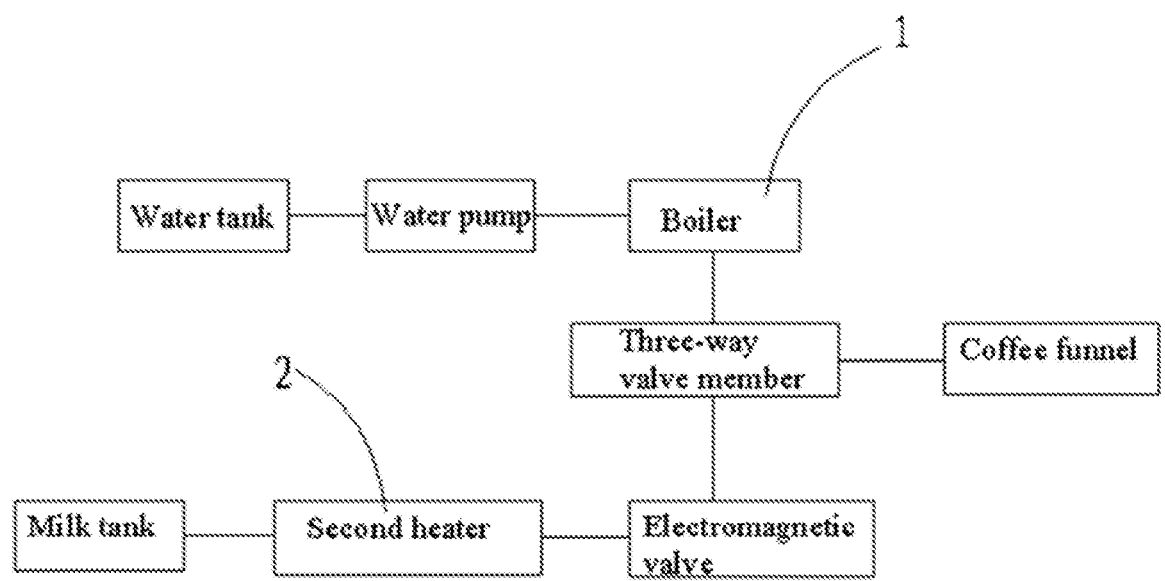
FIG. 2 is a schematic diagram of the structure of a liquid heating branch according to the utility model.
Figure 3:
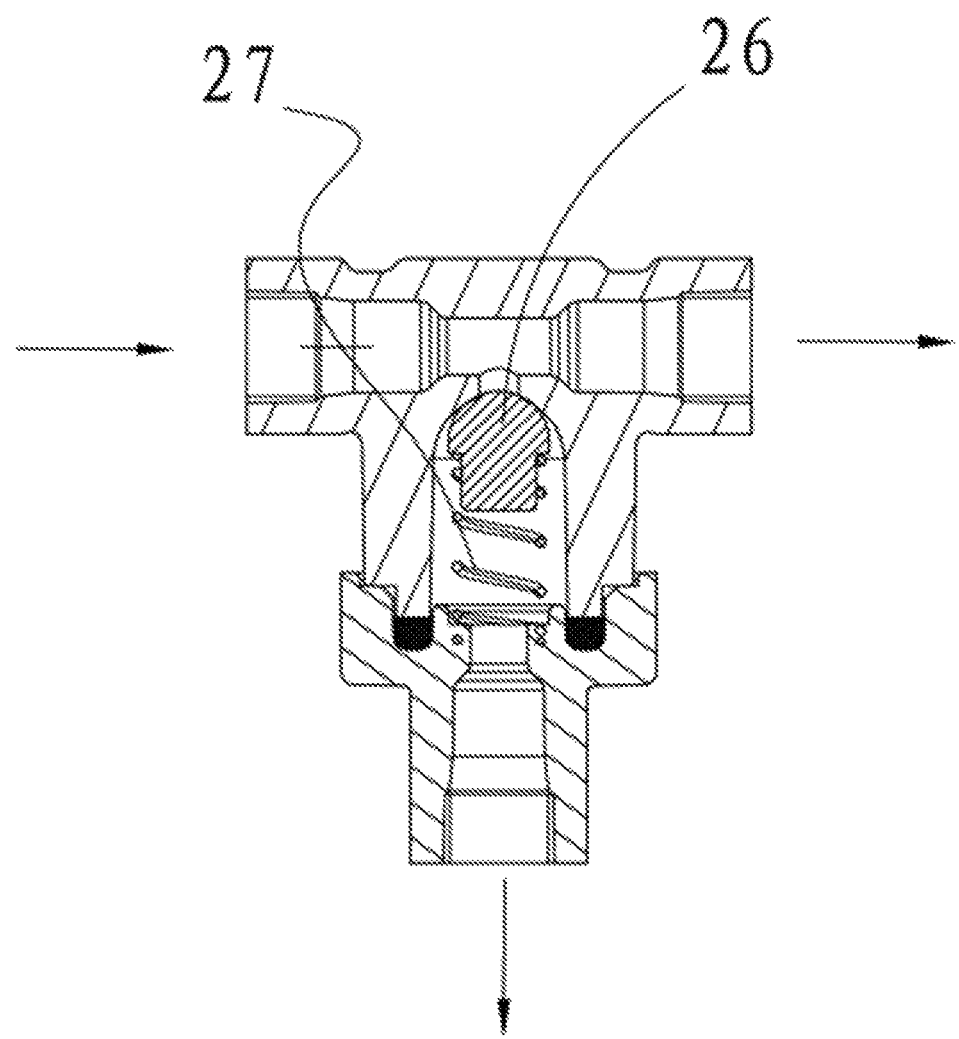
FIG. 3 is a schematic diagram of the structure of a three-way valve member according to the utility model.
Figure 4:
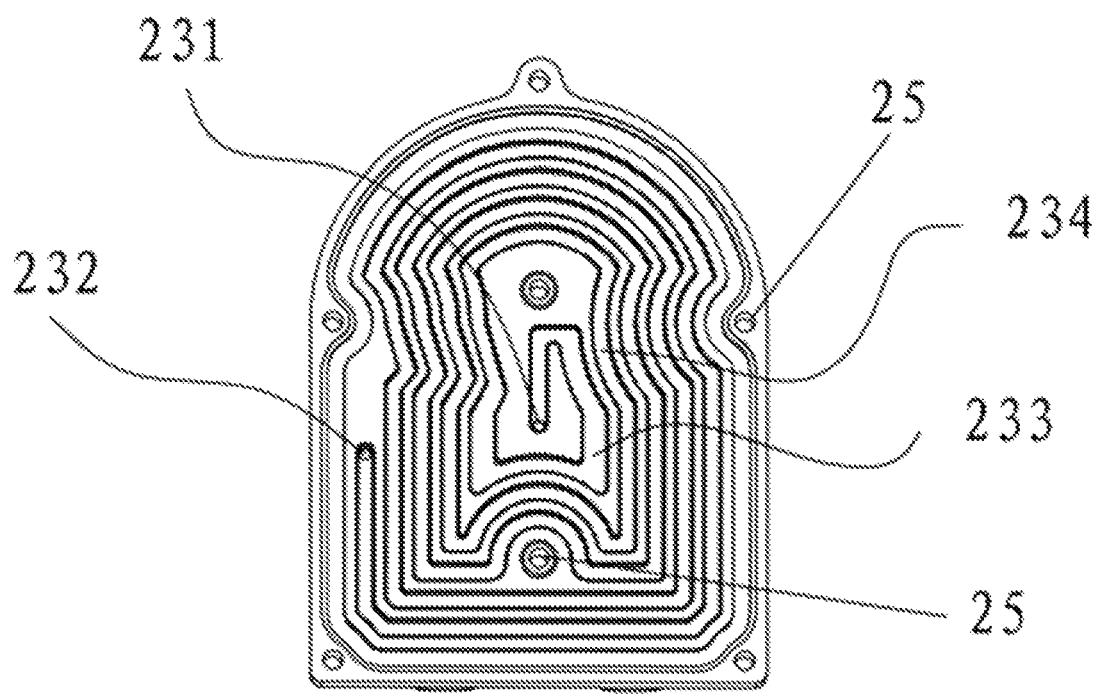
FIG. 4 is the second heater of the utility model.

With reference to FIGS. 1 to 4, a fancy coffee maker of the utility model comprises a water tank, a water pump, a first heater, a coffee funnel, a milk tank, a milk frother, a first branch for providing water vapor to the coffee funnel, and a second branch for providing high-temperature steam to the milk tank, and further comprises a three-way valve member. Wherein water in the water tank after being heated by the first heater enters the three-way valve member, the three-way valve member is, respectively connected to the first and second branches, and the second branch is connected by an electromagnetic valve, a second heater 2 and the milk tank in sequence. The first heater is a boiler 1, the water in the water tank is pumped into the boiler to heat through the water pump, and the generated water vapor can provide appropriate water vapor to a coffee extraction branch or a milk foam generation branch through the three-way valve member.

The second heater comprises a heat conductor and an electrical heated tube 21, the heat conductor is internally provided with a long and thin pipeline in a circuitous manner, and the electrical heated tube is arranged on the surface of the heat conductor. In order to further increase the temperature of the water vapor to facilitate the generation of the milk foam, the second heater is arranged on the second branch to heat the water vapor into superheated vapor, in order to fully heat the steam and save the occupation space of the heater a circuitous pipeline is arranged in the conductor, so that the heating time of the unit water vapor is increased.

The heat conductor is spliced by two metal plate members (22 and 23) in a sealing manner, the inner surface of one of the metal plate members is provided with a spiral involute groove 233 starting from a central point, the beginning and ending positions of the spiral involute groove are provided with an inlet and an outlet (231 and 232) of the heat conductor, the two metal plate members are provided with a plurality of location holes 25, and the spiral involute groove 234 near partial location holes is avoided by an arc-shaped groove.

The three-way valve member comprises a three-way valve body and a connecting pipe, the three-way valve body is internally provided with a communication chamber and a valve chamber, the valve port of the valve chamber is arranged in the communication chamber, the valve chamber is internally provided with a mushroom-head rubber plug 26 and a spring 27, and the spring is used for pushing the mushroom-head rubber plug, so that the valve port is closed. The connecting pipe is arranged at the outlet of the valve chamber, the end part of the connecting pipe is provided with a pipe port, the pipe port is connected to a valve chamber wall in a sealing manner, and the pipe port is internally provided with a spring installation platform. The connecting pipe is connected to the first branch.

When the milk foam needs to be made, the electromagnetic valve of the second branch is opened, the water vapor enters the second branch through a communication chamber of the three-way valve member from the boiler, and the high-temperature steam is provided to the milk frother after passing through the second heater. When the second branch is opened, a valve port of a valve chamber of the first branch is closed by the mushroom-head rubber plug, and the water vapor cannot enter the first branch through the valve chamber. Only when the electromagnetic valve of the second branch is closed, and the steam pressure generated by the boiler is larger than the pushing force of the spring in the valve chamber, the water vapor can enter the first branch through the communication chamber of the three-way valve member to provide the water vapor suitable for the coffee extraction to the coffee funnel.

The invention claimed is:

1. A fancy coffee maker, comprising a water tank, a first heater, a coffee funnel, a milk tank, a milk frother, a first branch for providing water vapor to the coffee funnel, and a second branch for providing high-temperature steam to the milk tank, and further comprising a three-way valve member, wherein water in the water tank after being heated by the first heater enters the three-way valve member, the three-way valve member is respectively connected to the first and second branches, and the second branch is connected, by an electromagnetic valve, a second heater and the milk tank in sequence;

wherein the second heater comprises a heat conductor and an electrical heated tube, the heat conductor is internally provided with a long and thin pipeline in a circuitous manner, and the electrical heated tube is arranged on the surface of the heat conductor;

wherein the heat conductor is spliced by two metal plate members in a sealing manner, the inner surface of one of the metal plate members is provided with a spiral involute groove starting from a central point, the beginning and ending positions of the spiral involute groove are provided with an inlet and an outlet of the heat conductor, the two metal plate members are provided with a plurality of location holes, and the spiral involute groove near partial location holes is avoided by an arc-shaped groove.

2. The fancy coffee maker according to claim 1, wherein the three-way valve member comprises a three-way valve body and a connecting pipe, the three-way valve body is internally provided with a communication chamber and a valve chamber, the valve port of the valve chamber is arranged in the communication chamber, the valve chamber is internally provided with a mushroom-head rubber plug and a spring, and the spring is used for pushing the mushroom-head rubber plug, so that the valve port is closed.

3. The fancy coffee maker according to claim 1, wherein the connecting pipe is arranged at the outlet of the valve chamber, the end part of the connecting pipe is provided with a pipe port, the pipe port is connected to a valve chamber wall in a sealing manner, and the pipe port is internally provided with a spring installation platform.

4. The fancy coffee maker according to claim 1, wherein the connecting pipe is connected to the first branch.

\* \* \* \* \*